(12) United States Patent
Rhoads et al.

(10) Patent No.: US 7,083,304 B2
(45) Date of Patent: Aug. 1, 2006

(54) APPARATUS AND METHOD OF USING LIGHT SOURCES OF DIFFERING WAVELENGTHS IN AN UNITIZED BEAM

(75) Inventors: Greg Rhoads, Irvine, CA (US); Ronald G. Holder, Laguna Niguel, CA (US)

(73) Assignee: Illumination Management Solutions, Inc., Irvine, CA (US)

( * ) Notice: Subject to any disclaimer, the term of this patent is extended or adjusted under 35 U.S.C. 154(b) by 13 days.

(21) Appl. No.: 10/903,142

(22) Filed: Jul. 30, 2004

(65) Prior Publication Data

US 2005/0047135 A1 Mar. 3, 2005

Related U.S. Application Data

(60) Provisional application No. 60/491,694, filed on Aug. 1, 2003.

(51) Int. Cl.
*F21V 9/00* (2006.01)
(52) U.S. Cl. .................................... 362/293; 235/373
(58) Field of Classification Search ............... 362/231, 362/247, 293, 240, 373, 294
See application file for complete search history.

(56) References Cited

U.S. PATENT DOCUMENTS

| | | | |
|---|---|---|---|
| 826,205 A | 7/1906 | Name not available | |
| 2,666,193 A | 1/1954 | Keegan | |
| 4,101,957 A | 7/1978 | Chang | |
| 4,151,584 A | 4/1979 | Labrum | |
| 4,211,955 A | 7/1980 | Ray | |
| 4,286,311 A | 8/1981 | Maglica | |
| 4,388,673 A | 6/1983 | Maglica | |
| 4,392,187 A | 7/1983 | Bornhorst | |
| 4,398,238 A | 8/1983 | Nelson | |
| 4,488,207 A * | 12/1984 | Harmon | 362/231 |
| 4,500,947 A | 2/1985 | Perkins | |
| 4,530,040 A | 7/1985 | Petterson | |
| 4,533,984 A | 8/1985 | Gatton | |
| 4,570,208 A | 2/1986 | Sassmannshausen | |
| 4,577,263 A | 3/1986 | Maglica | |
| 4,583,153 A | 4/1986 | Tsuyama | |
| 4,727,289 A | 2/1988 | Uchida | |
| 4,729,076 A | 3/1988 | Masami et al. | |
| 4,733,337 A | 3/1988 | Bieberstein | |
| 4,745,531 A | 5/1988 | Leclercq | |
| 4,803,605 A | 2/1989 | Schaller et al. | |
| 4,814,950 A | 3/1989 | Nakata | |
| 4,941,070 A | 7/1990 | Ogawa et al. | |

(Continued)

*Primary Examiner*—Ali Alavi
(74) *Attorney, Agent, or Firm*—Daniel L. Dawes; Myers Dawes Andras & Sherman LLP

(57) ABSTRACT

A plurality of light sources, each radiating a color of light; a corresponding plurality of reflectors are arranged and configured so that the reflector reflects light from a predetermined one of the plurality of light sources. The reflected light from the plurality of reflectors is mixed to generate a composite light from the plurality of light sources. A sequenced or stacked array of the light sources and dichroic reflectors mixes the reflected light from the reflectors. Each reflector is positioned on a common optical axis with an aligned corresponding one of the plurality of light sources to provide a light source and reflector pair. Each reflector is coated with a dichroic filter material which reflects the color of light radiated by the corresponding light source of the pair, and which transmits light radiated by all preceding light sources in the sequenced array.

25 Claims, 3 Drawing Sheets

U.S. PATENT DOCUMENTS

| | | |
|---|---|---|
| 4,959,757 A | 9/1990 | Nakata |
| 4,962,450 A | 10/1990 | Reshetin |
| 5,060,120 A | 10/1991 | Kobayashi et al. |
| 5,072,346 A | 12/1991 | Harding |
| 5,072,347 A | 12/1991 | Brunson |
| 5,103,381 A | 4/1992 | Uke |
| 5,249,109 A | 9/1993 | Denison et al. |
| 5,268,977 A | 12/1993 | Miller |
| 5,282,121 A | 1/1994 | Bornhorst et al. |
| 5,477,263 A | 12/1995 | O'Callaghan |
| 5,526,248 A | 6/1996 | Endo |
| 5,528,474 A | 6/1996 | Roney et al. |
| 5,577,493 A | 11/1996 | Parkyn et al. |
| 5,618,102 A | 4/1997 | Ferrell |
| 5,630,661 A | 5/1997 | Fox |
| 5,634,711 A | 6/1997 | Kennedy et al. |
| 5,673,990 A | 10/1997 | Neumann et al. |
| 5,711,590 A | 1/1998 | Gotoh et al. |
| 5,808,775 A | 9/1998 | Inagaki et al. |
| 5,857,767 A | 1/1999 | Hochstein |
| 5,897,196 A | 4/1999 | Soskind et al. |
| 5,899,559 A | 5/1999 | Lachmayer et al. |
| 5,904,417 A | 5/1999 | Hewett |
| 5,924,785 A | 7/1999 | Zhang et al. |
| 5,934,795 A | 8/1999 | Rykowski et al. |
| 5,954,428 A | 9/1999 | Eichhorn et al. |
| 5,986,779 A | 11/1999 | Tanaka et al. |
| 6,007,210 A | 12/1999 | Yamamoto et al. |
| 6,045,240 A | 4/2000 | Hochstein |
| 6,076,948 A | 6/2000 | Bukosky et al. |
| 6,123,440 A | 9/2000 | Albou |
| 6,149,283 A * | 11/2000 | Conway et al. ............. 362/236 |
| 6,168,288 B1 | 1/2001 | St. Claire |
| 6,220,736 B1 | 4/2001 | Dobler et al. |
| 6,227,685 B1 | 5/2001 | McDermott |
| 6,252,338 B1 | 6/2001 | Bergman et al. |
| 6,280,071 B1 | 8/2001 | Yamamoto et al. |
| 6,354,721 B1 | 3/2002 | Zattoni |
| 6,371,636 B1 | 4/2002 | Wesson |
| 6,406,171 B1 | 6/2002 | Satsukawa et al. |
| 6,485,160 B1 | 11/2002 | Sommers et al. |
| 6,502,952 B1 | 1/2003 | Hartley |
| 6,536,899 B1 | 3/2003 | Fiala |
| 6,547,423 B1 | 4/2003 | Marshall et al. |
| 6,575,609 B1 | 6/2003 | Taniuchi et al. |
| 6,575,610 B1 | 6/2003 | Natsume |
| 6,603,243 B1 | 8/2003 | Parkyn et al. |
| 6,641,287 B1 | 11/2003 | Suchiro |
| 6,685,336 B1 | 2/2004 | Neiser |
| 6,741,406 B1 | 5/2004 | Kitamura et al. |
| 6,796,690 B1 | 9/2004 | Bohlander |
| 6,796,698 B1 | 9/2004 | Sommers et al. |
| 6,827,467 B1 | 12/2004 | Tenmyo |
| 6,969,180 B1 * | 11/2005 | Waters ....................... 362/293 |
| 2002/0105809 A1 | 8/2002 | Kuijk et al. |
| 2002/0145884 A1 | 10/2002 | Yamamoto |
| 2003/0007359 A1 | 1/2003 | Sugawara et al. |
| 2003/0090906 A1 | 5/2003 | Hayakawa |
| 2004/0017685 A1 | 1/2004 | Dedoro |
| 2004/0145910 A1 * | 7/2004 | Lisowski .................... 362/519 |

* cited by examiner

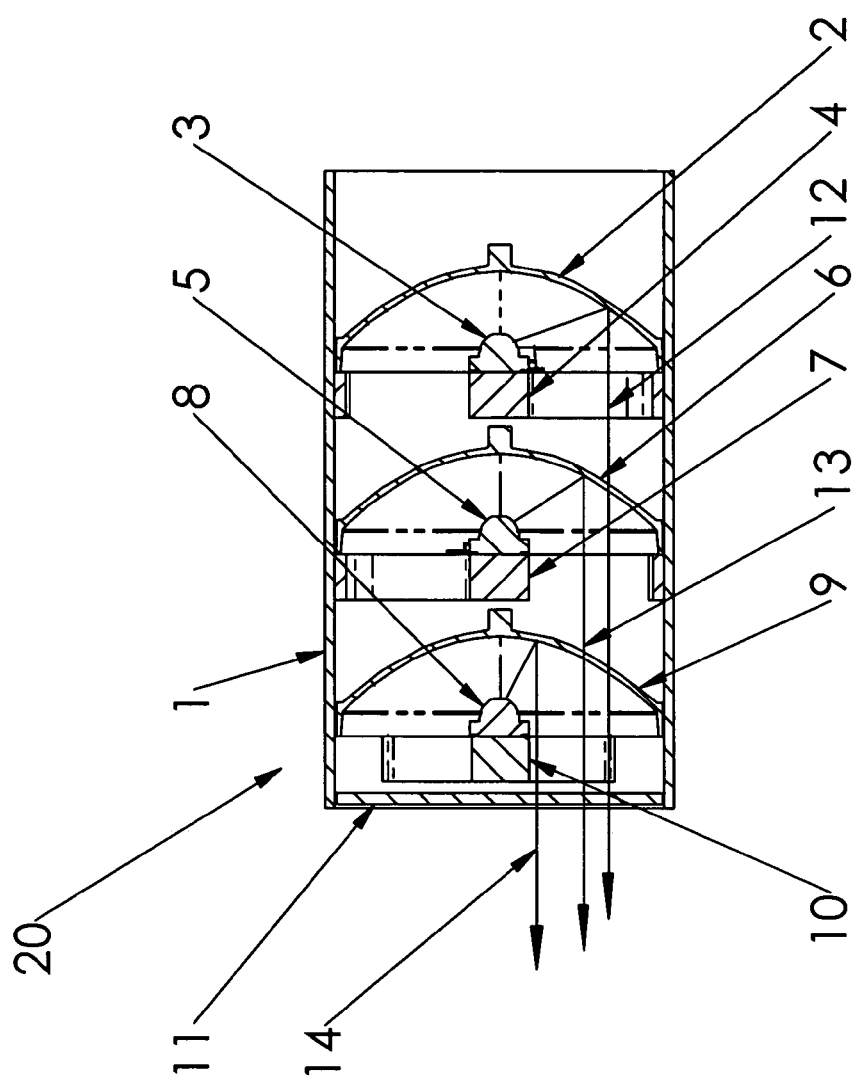
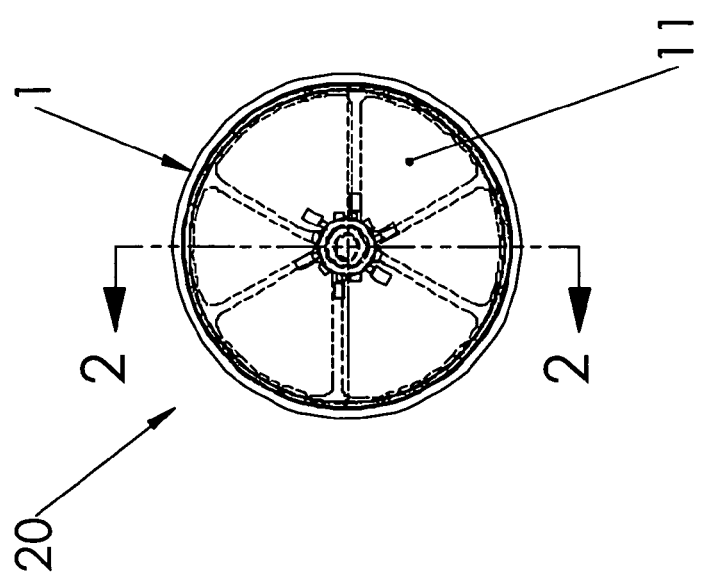
Figure 2
Figure 3

APPARATUS AND METHOD OF USING LIGHT SOURCES OF DIFFERING WAVELENGTHS IN AN UNITIZED BEAM

RELATED APPLICATIONS

The present application is related to U.S. Provisional Patent Application, Ser. No. 60/491,694 filed on Aug. 1, 2003, which is incorporated herein by reference and to which priority is claimed pursuant to 35 USC 119.

BACKGROUND OF THE INVENTION

1. Field of the Invention

The invention relates to the field of apparatus and method for using light emitting diodes (LED) or other light sources of differing wavelengths in an approximately unitized beam, sharing similar angle space.

2. Description of the Prior Art

Color projection systems have been used for many years to project motion pictures and still photographs onto screens for viewing. More recently, presentations using multimedia projection systems have become popular for conducting sales demonstrations, business meetings, and classroom instruction. In a common operating mode, multimedia projection systems receive analog video signals from a personal computer ("PC"). The video signals may represent still, partial-, or full-motion display images of a type rendered by the PC. The analog video signals are typically converted in the projection system into digital video signals, and the signals are electronically conditioned and processed to control an image-forming device, such as a liquid crystal display ("LCD") or a digital micromirror device ("DMD").

A popular type of multimedia projection system employs a broad spectrum light source and optical path components upstream and downstream of the image-forming device to project the image onto a display screen.

However, the optical performance of conventional projectors is often less than satisfactory. For example, suitable projected image brightness is difficult to achieve, especially when using compact portable color projectors in a well-lighted room. The projectors typically use high intensity arc lamps as their light source and then filter out all of the light except for blue, green, and red light and employ three separate light paths or some forms of sequential color modulator to coordinate color image data. Such white light systems typically use a series of dichroic mirrors to fraction the light into red, green and blue wavelengths and then remix the light from each beam after passing each through an LCD mask which as been configured to provide a red, green and blue component of the final desired image. The optical path lengths are long and there are a number of reflections and filtration steps which must be performed with resulting loss in intensity and resolution. The physical package which must be provided for such a system can be large.

Because LCD displays have significant light attenuation and triple path color light paths are heavy and bulky, portable multimedia projectors typically employ DMD displays in a single light path configuration. Producing a projected color image with this configuration typically requires projecting a frame sequential image through a sequential color modulator, such as a color wheel.

Another form of color illuminator combines red, green, blue, cyan and amber colored LED sources in order to increase brightness in a complex reflected optical path to mix the resultant light in an integrator rod. Again the optical path ways are long, the optical system is necessarily physically large and the overall performance is still subject to intensity and collimation losses. In this case the output of the integrator rod is a single color and a plurality of such color illuminators must be employed to obtain a large scale pixel image.

What is needed is a some kind of a controllable color light source which is not subject to the inherent disadvantages of such prior art displays or other conventional colored light systems.

BRIEF SUMMARY OF THE INVENTION

The invention pertains to the use of light emitting diodes (LED) in a device that combines the energy from multiple LEDs of differing wavelengths into an approximate unitized beam, sharing similar angle space or projection beam envelope. The invention provides for the efficient collection of energy radiating from two or more LEDs, and then distributes this energy into a common physical space or solid angle of radiation. The invention further includes thermally managing the device and contemplates electronic control of the individual LEDs.

By choosing different color outputs for the LED and since the LED are individually controllable, device may be used generally in a wide variety of applications as a generic source of selectively controllable colored light.

The invention is a highly efficient LED based device with an energy source, at least two LEDs, at least two reflectors, a means for mounting each of the LEDs over the reflectors which double as heat sinks such as a thermally conductive bridge, and a housing. The LEDs are mounted on a heat conductive material or bridge that provides the thermal management for the LEDs. This bridge also situates the LEDs over the reflectors with the primary light direction of the LEDs facing rearwardly into the reflectors. The reflectors then reflect the light back out the front facing direction of the device. The mechanical design of the bridge is a predetermined compromise between occluding the light returning from the reflectors and providing the thermal management for the LEDs.

The reflectors may be designed to provide a collimated beam, a convergent beam or a divergent beam. The reflectors may have a common conic shape or not and may be faceted or dimpled or otherwise modified to provide a desired beam pattern. Any configuration or form of optical reflector now known or later devised can be equivalently employed. The device may optionally have at least one lens or surface(s) that further control(s) the light from the reflectors.

More particularly the invention is an apparatus for generating a selected color of light comprising a plurality of light sources disposed in a housing, each radiating a color of light and a corresponding plurality of reflectors disposed in the housing. Each reflector is longitudinally paired with a light source to reflect light from a paired one of the plurality of light sources. The light sources and reflectors are arranged and configured to mix reflected light from the reflectors into a composite light beam from the plurality of light sources. The arrangement in the illustrated embodiment is comprised a sequenced or stacked array of the light sources and dichroic reflectors. In other words, the arrangement of light sources and reflectors comprises a sequenced array of the plurality of light sources and reflectors in an alternating pairs of reflectors and light sources. Each reflector is positioned on a common optical axis with an aligned corresponding one of the plurality of light sources to provide a light source and reflector pair. Each reflector with the possible exception of the first reflector of the sequenced array is coated with a dichroic filter material which reflects the color of light radiated by the corresponding light source of the pair, and which transmits light radiated by all preceding light sources in the sequenced array. The result is that the stacked assembly of light sources and reflectors have an overall envelope radius or size which is approximately equal to or comparable to the beam aperture radius or size. The stacked assembly is compact and the optical path length of the light components and the number of reflections encountered is minimized. Using this design arrays of such stacked assemblies can be assembled which are arbitrarily color controllable, have very little dead space, have very little source intensity loss, and produce highly collimated beams.

The plurality of light sources generate a full color spectrum of visible light, or more specifically green, blue and red light in selected amounts. The apparatus further comprising means for individually controlling the intensity of light from each of the light sources, such as conventional drive circuits coupled to the light sources.

The apparatus further comprising a corresponding plurality of heat sinks. Each heat sink is thermally coupled to one of the plurality of light sources. The heat sink further comprises a fixture for mounting each corresponding light source relative to the corresponding reflector. The apparatus still further comprises a housing thermally coupled to each of the heat sinks.

The plurality of light sources and reflectors are assembled into a unit and a plurality of such units is arranged and configured into a compound system or array. The compound system includes, but is not limited to, such applications as a large format LED display screen, a backlight for an LCD screen, a light source for a digital light projection system, a digital cinema projector, a color video projector, a color changing light source for a display, an architectural light, a theater and stage light, or a light source for a color corrected display system.

Each unit mixes the light by time-multiplexing the generation of colored light from the unit by cycling individual light sources to generate corresponding color images.

In addition the individual units may be controlled to radiate at the same time with different intensities to form what can be defined as color multiplexed light.

The invention also includes a method of providing and operating the apparatus described above.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 2 is a side cross-sectional view of the embodiment of FIG. 1 as seen through section lines 2—2 of FIG. 3.

FIG. 3 is an end plan view of the embodiment of FIG. 2.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
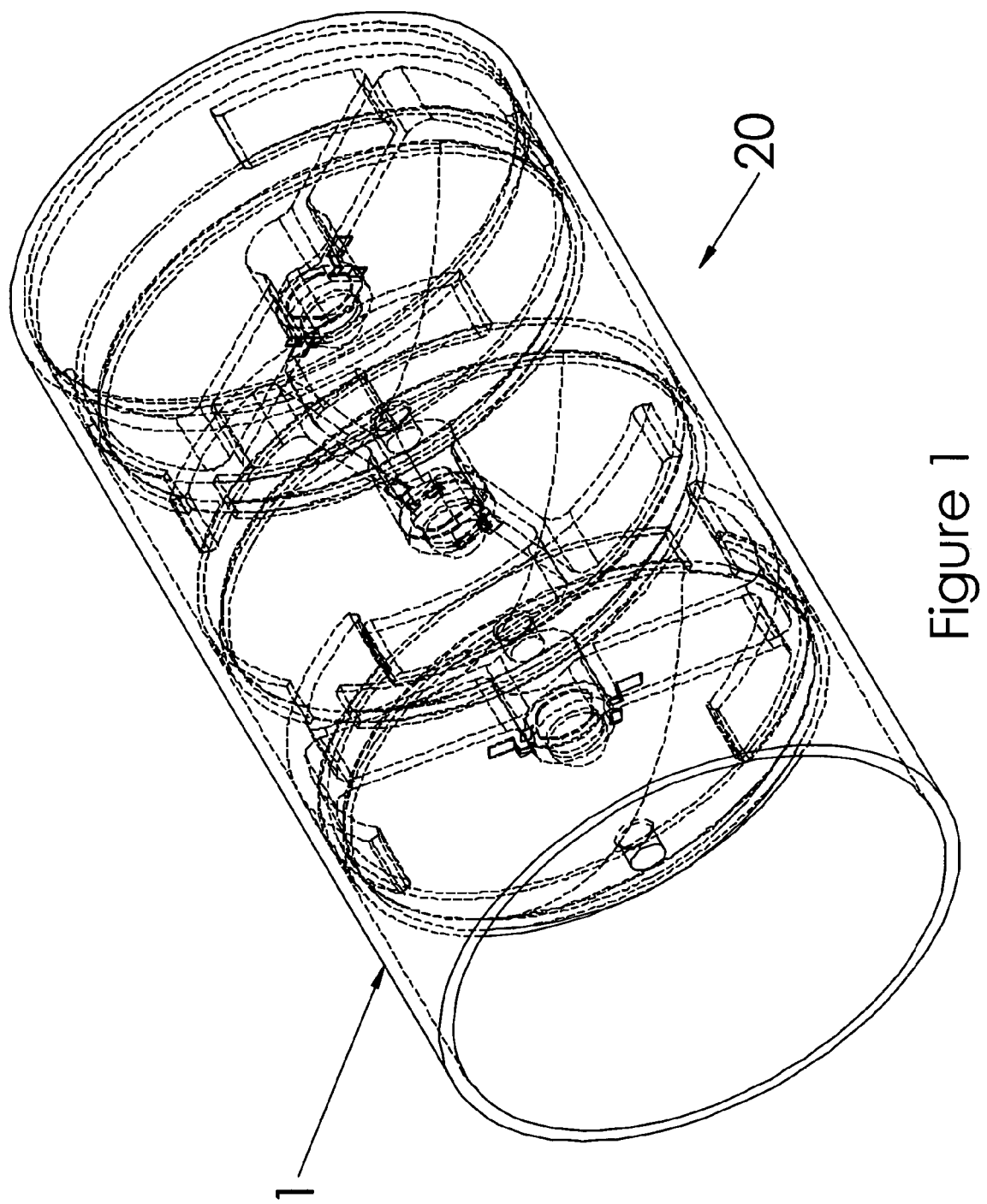
FIG. 1 is a perspective view of one embodiment of the invention in which three LEDs are used and shown in phantom outline in a housing.

Turn to FIGS. 1–3 wherein the illustrated embodiment of the invention is depicted. FIG. 1 is a perspective view of the device, generally denoted by reference numeral 20, which is comprised of a housing 1 and various optical elements described below. Housing 1 in the illustrated embodiment serves to align the various optical elements of the device. One of the optical elements is a reflector 2 which is disposed in a rearward position of device 20 as shown in the left end portion of the side cross-sectional view of FIG. 2 and which can be coated to reflect substantially all the light from light emitting diode, LED, 3, which is held in position over reflector 2 by means of a heat sink 4. By LED it is understood to include a solid state light emitting diode package, which includes a semiconductor substrate in which the light emitting junction is defined, electrical leads, passivation layers and a lens or lens assembly mounted on or forming part of the passivating package around the junction and substrate. The illustrated embodiment employs an LED 3, but it is to be understood that any light source may be employed which is now known or later devised, such as incandescent, fluorescent, arc, or gas plasma sources as a few examples. Thus, wherever LED is referred, it is to be understood according to the context that any light source could be equivalently substituted.

The light reflected by reflector 2, represented by a light ray 12 passes through the reflector 6, where it combines with the light ray 13 radiating from LED 5 suspended by means of heat sink 7 and reflecting off reflector 6. Reflector 6 is coated with a material which is commonly referred to as a thin film or a dichroic filter. A dichroic filter material selectively transmits light according to its wavelength and are well known to the art. This filter material on reflector 6 is designed or selected to reflect the wavelength of LED 5, while transmitting the wavelength of LED 3.

Rays 12 and 13 pass through reflector 9 and combine with the ray 14 that radiates from LED 8, which is suspended on heat sink 10 reflecting off reflector 9. Reflector 9, similarly as reflector 6, is coated with a dichroic filter material designed to reflect the wavelength of LED 8 and transmit all other wavelengths. It is also within the scope of the invention to select the dichroic filter materials on reflectors 2, 6 and 9 to reflect or transmit more specific wavelengths other than those radiated by the LEDs 3, 5 and 8 of the device 20. It must also be understood that less or more than three LEDs may be combined in device 20 according to the foregoing teachings.

Heat sinks 4, 7 and 10 are typically comprised of metal but any thermally conductive material may be employed. Heat sinks 4, 7 and 10 are formed in the shape of a cylindrical radially defined body which flushly mounts into housing 1 with a pair a diametrically extending arms leading to a central mounting boss to which the corresponding LED is mounted. Hence, housing 1 may also be thermally conductive and be employed in the heat management of LEDs 3, 5 and 8. The arms may carry wires and/or form part of the electrical circuit with their respective LEDs. FIG. 3 is an end plan view as seen from the right end of the side cross-sectional depiction of FIG. 2. In the illustrated embodiment the arms of heat sinks 4, 7 and 10 are azimuthally offset from each other so that the arms of all three heat sinks 4, 7 and 10 are not angularly aligned with each other. This assists in reducing the light shadow or obstruction caused by the arms.

Alternative means of mounting and thermally handling the LEDs or light sources is also included within the scope of the invention. For example, the heat source could be devised as a thermally conductive, flat transparent substrate, such as made from glass, quartz, heat resistant plastic, or a crystalline material to which the LED or light source is mounted and thermally coupled, while transparent indium tin oxide leads are disposed on the substrate to provide electrical connection to the LED or light source.

The lens or lenses 11 may be optionally provided to spread or converge the combined light beam, asymmetrically or not, or provide diffusion or other optical effects according to conventional design options.

By selecting appropriate colored LEDs 2, 5, 8 and controlling the output of the individual LEDs 2, 5, 8, the device 20 could be used either alone or in arrays for several different and distinct purposes. These uses include: a pixel for large format LED display screens, a backlight for LCD screens, a light source for projection systems, a color changing light source for displays, architectural lighting, theater and stage lighting, a light source for color corrected display systems and many other lighting related applications.

In a preferred embodiment as shown in FIGS. 1–3, the device 20 is shown with three LEDs 3, 5, 8. One of LEDs 3, 5, 8 is red, one is green and one is blue. The red LED 3, for example, would preferably be farthest from the front of the device 20 and situated over a highly reflective concave surface of reflector 2. The light emitted from the red LED 3 reflects off the surface of reflector 2 and passes through a plane that is defined as the "mouth" of the reflector 2. The green LED 5 is situated over a reflector 6 that is coated in such a way as to allow the red light to pass through it and to reflect the green light radiated from the green LED 5 situated over reflector 6 in a similar manner to the red LED 3. The red and green light can now be considered mixed in the same physical space or at the mouth of reflector 6. The next LED 8 is blue and is similarly situated over a reflector 9 that is coated to reflect the blue light radiated from the blue LED 8 and to allow the red and green light to pass through it. The light from all three LEDs 3, 5, and 8 can then be considered as mixed in the same physical space or at the mouth of reflector 9. By separately adjusting the light output of the individual LEDs 3, 5, and 8 by means of any conventional LED drive circuit (not shown) in theory any color of light beam can be produced by the invention.

Figure 4:
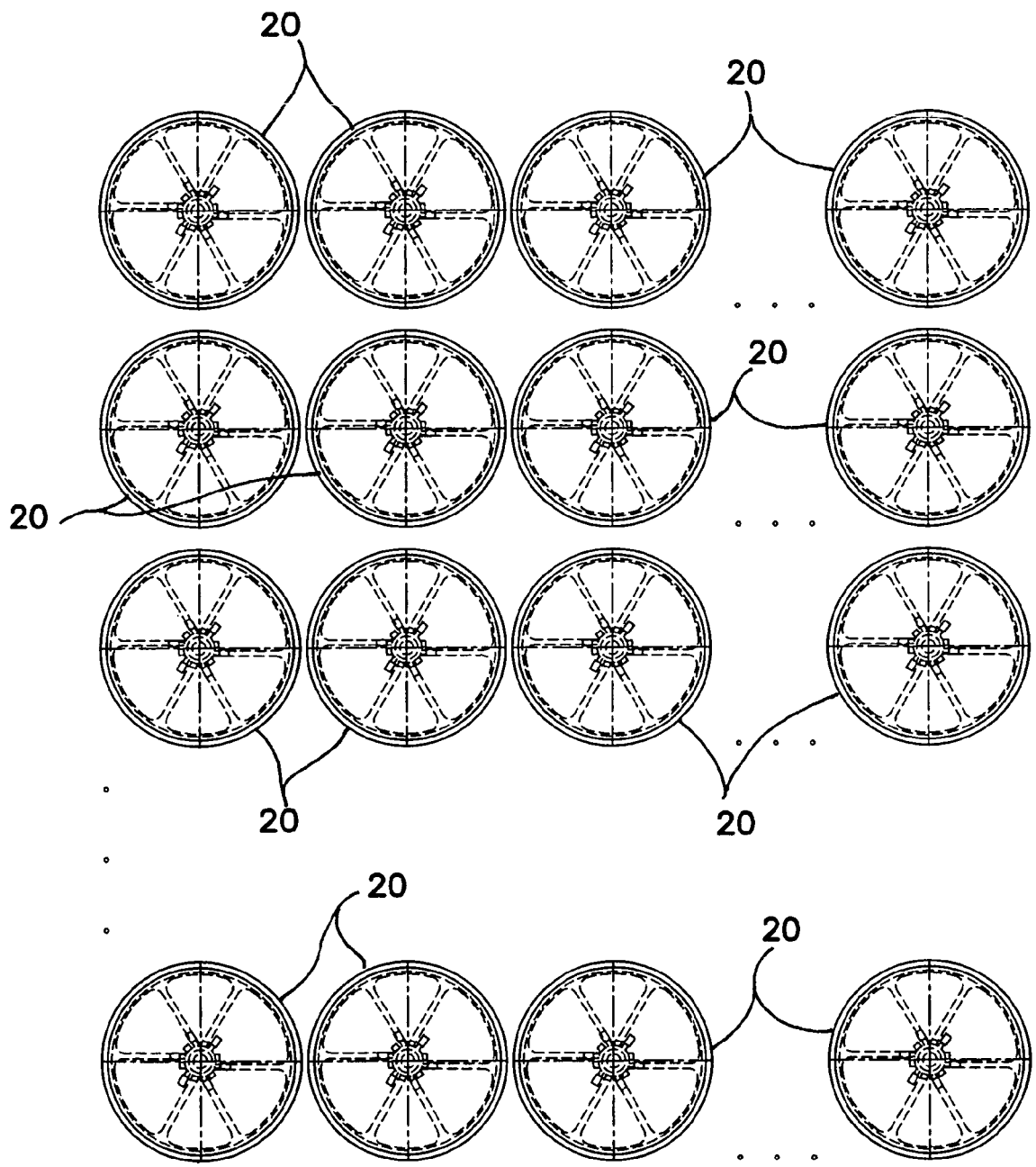
FIG. 4 is a diagram of a plurality of devices as shown in FIG. 1.

The optical output of device 20 can be modified by use of a lens or a lens assembly 11 in front of the output mixed beam transmitted from the mouth of reflector 9. Lenses 11 could provide beam spreading or converging. Alternatively, a semi-transparent material could be placed in front of the beam to create a rear-illuminated display. A plurality of devices 20 can be arrayed to create additional compound devices such as a large format video screens as shown in FIG. 4.

The device can be used for illumination for projection systems alone or in an array. Due to the devices very collimated beam, the device could be used as a light source for liquid crystal display (LCD) based, digital light projection (DLP) based or other similarly controlled projection systems, including digital cinema. By controlling the individual LED current the white point, as defined as the neutral or all-colors spectral mix, can be modified as desired for systems made from a plurality of devices 20.

An additional capability for LCD or DLP systems comprised of a plurality of devices 20 is a time-multiplexed color generation by cycling the individual LEDs to alternate color frames in a video. For example, if it is desired to have a 30 frames per second display, then the red LED 3 can be turned on with the green LED 5 and blue LED 8 off for about 1/90th of a second while the display shows the first frame's red content. Then the green LED 5 would turn on and the red LED 3 and the blue LED 8 off for about the next 1/90th second. Then the blue LED 8 is turn on and the red LED 3 and green LED 5 off for about 1/90$^{th}$ of a second. The cycle then repeats for the next frame. In contrast, the sequential color projection of the prior art uses a rotating color filter wheel in a white beam.

Hence, it can now be appreciated that the invention provides an electronically controllable colored light source which is physically compact and provides a single, selectively controllable, colored beam of light with a minimum of the number of optical elements and reflective surfaces and a minimum optical path length. The invention is advantageously characterized as having an overall package envelope which is substantially the same as or close in size to ultimate useful light aperture of the beam.

The nature of the invention is such than when no light is being produced, the dark field seen looking into the stacked area is very high since the reflective surfaces are well shielded from stray or ambient light. Hence, when a plurality of illuminators are used in an array, one illuminator for each pixel, the contrast between lit and unlit pixels of the image produced by the array is high. This is of particular advantage in large area displays with high information content (LA-DHIC) such as are used in many sports venues.

Further, the fact that the beam aperture is very nearly the same size as the envelope size for the stack, allows the stacks to be combined in very compact arrays with very little dead space, which is of particular advantage for use in colored spot lights used for theatrical illumination. The design of the stacks allows them to be made with any space-filling cross-sectional shape, such as square, hexagonal, octagonal and the like. Further, the design also lends itself to inexpensive fabrication since the components can be miniaturized and mass-produced in plastics or other inexpensive and easily manufacturable materials, again which is advantageous in applications where arrays of the stacked assemblies are used.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus for generating a selected color of light comprising:
    a housing;
    a plurality of light sources disposed in the housing, each radiating a color of light into an aperture of defined radial size; and
    a corresponding plurality of reflectors disposed in the housing, each reflector arranged and configured to reflect light from a predetermined one of the plurality of light sources into the aperture, where the plurality of light sources and reflectors are arranged and configured with respect to each other to mix reflected light from the reflectors into a composite beam from the plurality of light sources into the aperture, the housing having a radial size comparable to the radial size of the aperture.
    where the arrangement and configuration of the plurality of light sources and reflectors to mix reflected light from the reflectors comprises a sequenced array of the plurality of light sources and reflectors in an alternating pairs, each reflector being positioned on a common optical axis with an aligned corresponding one of the plurality of light sources to provide a light source and reflector pair, each reflector with the possible exception of the first reflector of the sequenced array having a dichroic filter material which reflects the color of light radiated by the corresponding light source of the pair, and which transmits light radiated by all preceding light sources in the sequenced array.

2. The apparatus of claim 1 where the plurality of light sources generate a full color spectrum of visible light.

3. The apparatus of claim 1 where the plurality of light sources generate green, blue and red light in selected amounts.

4. The apparatus of claim 1 where at least some of the plurality of reflectors are coated with a dichroic filter material.

5. A method for generating a selected color of light comprising:
    radiating light from selected ones of a plurality of colored light sources contained within a housing with a maximum radial size comparable to an aperture of defined size;
    reflecting light from each of the light sources into a common light beam into the aperture; and
    mixing reflected light in a common beam to generate a composite light of a selected composite color from the plurality of light sources.
    where mixing reflected light from the reflectors comprises providing a sequenced longitudinal array of the plurality of light sources and reflectors in an alternating pairs of light sources and reflectors, and where reflecting light from each of the light sources into a common light beam comprises reflecting light radiated from a light source by the corresponding reflector of the pair along a common optical axis while transmitting light from other ones of the plurality of light sources corresponding to other reflectors along the common optical axis with the possible exception of the first reflector of the sequenced array.

6. The apparatus of claim 1 further comprising a corresponding plurality of heat sinks, each heat sink thermally coupled to one of the plurality of light sources.

7. The apparatus of claim 6 where each heat sink comprises a fixture for mounting each corresponding light source relative to the corresponding reflector.

8. The apparatus of claim 6 where each heat sink comprises a thermally conductive, transparent substrate disposed in the housing to which the light source is mounted and thermally coupled.

9. The apparatus of claim 8 where the housing is thermally coupled to each of the heat sinks.

10. The apparatus of claim 1 wherein the plurality of light sources, and reflectors comprise a color pixel unit and further comprising a plurality of color pixel units arranged and configured into a compound system.

11. The apparatus of claim 10 where the compound system comprises a large format LED display screen, a backlight for an LCD screen, a light source for a digital light projection system, a digital cinema projector, a color video projector, a color changing light source for a display, an architectural light, a theater and stage light, or a light source for a color corrected display system.

12. The apparatus of claim 10 where in each unit time-multiplexes the generation of colored light from the unit by cycling individual light sources to generate corresponding color images.

13. The apparatus of claim 10 where in each unit mixes the generation of colored light from the unit by selectively controlling the intensity of individual light sources to generate corresponding color images.

14. The method of claim 5 where reflecting light from each of the light sources into a common beam comprising reflecting at least some of the radiated light from reflectors coated with a dichroic filter material.

15. The method of claim 5 where radiating light from selected ones of a plurality of colored light sources comprises generating a full color spectrum of visible light.

16. The method of claim 5 where radiating light from selected ones of a plurality of colored light sources comprises generating green, blue and red light in selected amounts.

17. The method of claim 16 where radiating light from selected ones of a plurality of colored light sources comprises generating a full color spectrum of visible light.

18. The method of claim 17 where radiating light from selected ones of a plurality of colored light sources comprises generating green, blue and red light in selected amounts.

19. The method of claim 5 further comprising thermally controlling each of the light sources by means of a corresponding plurality of heat sinks, each heat sink thermally coupled to one of the plurality of light sources.

20. The method of claim 19 further comprising positioning each corresponding light source relative to the corresponding reflector by means of the heat sink.

21. The method of claim 20 further comprising thermally coupling each of the heat sinks to a common housing.

22. The method of claim 5 further comprising combining the plurality of light sources, reflectors into a unit and arranging and configuring a plurality of units into a compound system.

23. The method of claim 22 where arranging and configuring a plurality of units into a compound system comprises arranging and configuring a plurality of units into a large format LED display screen, a backlight for an LCD screen, a light source for a digital light projection system, a digital cinema projector, a color video projector, a color changing light source for a display, an architectural light, a theater and stage light, or a light source for a color corrected display system.

24. The method of claim 22 where mixing reflected light in the common beam to generate a composite light beam of a selected composite color from the plurality of light sources in each unit comprises time-multiplexing the generation of colored light from the unit by cycling individual light sources to generate corresponding color images.

25. The method of claim 22 where mixing reflected light in the common beam to generate a composite light beam of a selected composite color from the plurality of light sources in each unit comprises color-multiplexing the generation of colored light from the unit to generate corresponding color images.

* * * * *